United States Patent

[11] 3,617,177

[72] Inventor Yutaka Hosoda
 Tokyo, Japan
[21] Appl. No. 741,227
[22] Filed June 28, 1968
[45] Patented Nov. 2, 1971
[73] Assignee Mitsui Kagaku Kogyo Kabushiki Kaisha
 (Mitsui Chemical Industry Co., Ltd.)
 Chuo-ku, Tokyo, Japan

[54] METHOD OF DYEING ALUMINUM-MODIFIED POLPROPYLENE FIBERS WITH MONOAZODYE
2 Claims, No Drawings
[52] U.S. Cl. .................................................. 8/42, 260/207, 8/180
[51] Int. Cl. .................................................. D06p 1/10, C09b 45/46
[50] Field of Search .................................................. 8/42, 180; 260/207

[56] References Cited
UNITED STATES PATENTS
3,257,379 6/1966 May et al. .................... 8/42 X
3,389,956 6/1968 Mohr et al. .................... 8/42

Primary Examiner—George F. Lesmes
Assistant Examiner—Patricia C. Ives
Attorney—Wenderoth, Lind & Ponack ABSTRACT: Method of dyeing metal-modified polyolefin fibers, which comprises applying a monoazo dye of the formula

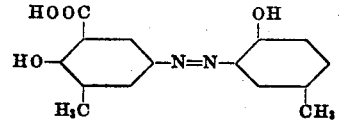

to metal-modified polyolefin fibers.

METHOD OF DYEING ALUMINUM-MODIFIED POLPROPYLENE FIBERS WITH MONOAZODYE

This invention relates to a method of dyeing metal-modified polyolefin fibers with a monoazo dye which can be expressed by a formula

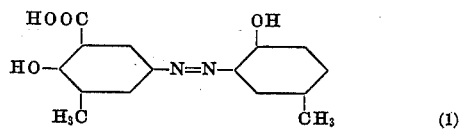

The object of the invention is to provide a method of dyeing metal modified polyolefin fibers, particularly aluminum-modified polypropylene fibers, yellow of brightness and fastness.

As a means to improve the poor dye affinity of polypropylene fibers, a process has been proposed in which chelate-forming metal salts such as fatty acid salts of aluminum, nickel, zinc, etc. are incorporated with polypropylene fibers to form dyeable metal-modified polypropylene fibers, and thereafter the fibers are dyed with such dyestuffs which can form chelate ring with the above metals. However, it is by no means easy to find satisfactory dyes for all colors. Particularly dyeing of aluminum-modified fibers bright, fast and pure yellow has been regarded very difficult.

We have experimented on dyeability of aluminum-modified fibers with various monoazo dyes formed by coupling 5-aminosalicylic acid or 5-amino-o-cresotinic acid, which is used as the diazo component, with various compounds having hydroxyl groups. As the result we discovered a surprising fact that the monoazo dye of the formula 1, which is obtained by coupling 5-amino-o-cresotinic acid with p-cresol, exhibits excellent ability to dye the fibers clear and pure yellow, and that the light fastness of the color is of the highest grade. We furthermore discovered that only the specified monoazo dye could achieve all of the foregoing objects. That is, the clear color tone can be satisfactorily obtained with the monoazo dyes formed by coupling 5-aminosalicylic acids with acetanilides, but the color exhibits extremely low light fastness. Neither the homologues nor analogues of the structure of formula 1 show the excellent effect of the dye of this invention. His statement is substantiated by table 1 below, which gives the experimental results of dyeability of aluminum-modified polypropylene fibers with the dyes synthesized from diazo components and coupling components selected from close analogues of the specified components of the subject dye.

From the same table, it can be clearly understood that when the coupling component has any conventional substituent in the art, such as halogen, long chain alkyl, substituted amino group, etc. on its benzene ring, the resultant monoazo dyes exhibit inferior dyeing effect. Also when the coupling component has a methyl group at ortho or metaposition to the hydroxyl group, or has a methyl group at orthoposition besides that at paraposition, neither the resultant dyes possess equivalent dyeing properties to those of the subject dye.

TABLE 1

|  | Diazo component | Coupling component | Dyeing properties in 100° C. dyeing | Light fastness [2] of dyed good (class) |
|---|---|---|---|---|
| Compounds of the invention | HOOC, HO–, H₃C, –NH₂ | HO–⬡–CH₃ | ◎ | 7–8 |
|  |  | HO–⬡–C₂H₅ | △ | 4 |
|  |  | HO–⬡–C₄H₉(t) | △–X | ------ |
|  |  | H₃C–⬡–OH | △ | 1 |
|  |  | CH₃–⬡–OH (CH₃) | X | ------ |
| Analogous compounds | HOOC, HO–, H₃C, –NH₂ | HO–⬡–CH₃ (CH₃, CH₃) | △–○ | 5 |
|  |  | HO–⬡–Cl | △ | ------ |

TABLE 1

| Diazo component | Coupling component | Dyeing properties in 100° C. dyeing [1] | Light fastness of dyed good (class) [2] |
|---|---|---|---|
| | (C₂H₅)₂N—⌬—OH | ○ | 1 |
| | HO—⌬—⌬ | ○ | 1 |
| | ⌬—⌬—OH | ○ | 1 |
| Analogous compounds …… HOOC—⌬(HO-)(—NH₂) | HO—⌬—CH₃ | △–○ | 3–4 |
| | HO—⌬—C₄H₉(t) | △ | |

Note.—[1] ⊙=Excellent; ○=Satisfactory; △=Poor; X=Very poor.
[2] Measured in accordance with JIS L-1044 (1959).

The dyestuff of this invention can dye nickel- or zinc-modified polypropylene fibers yellow, with the light fastness of, respectively, 7–8 and 6, although the hue was not quite as clear as that on aluminum-modified polypropylene fibers.

The dye of the formula 1 is prepared by diazotizing 5-amino-o-cresotinic acid, and coupling the same with p-cresol. For example, a simple method will comprise diazotizing 5-amino-o-cresotinic acid in the accepted manner, neutralizing the excessive mineral acid, mixing with sodium salt solution of p-cresol, and stirring the mixture for a prolonged period until all the diazo component is consumed. The product dye is precipitated form the reaction liquid in the form of sodium salt, which can be separated by filtration. If desired, the precipitate so separated may be dissolved or suspended in water and obtained in the form of free acid after acidifying the system. The dye thus obtained by filtration can be ground with a dispersing agent to be converted to a disperse dye.

Incidentally, the dye of the formula 1 may appear to be obtainable also by coupling 2-amino-p-cresol with o-cresotinic acid, but it is impossible to obtain the dye by such method.

The invention will be explained in further details by way of the following Examples.

EXAMPLE 1

16.7 Grams of 5-amino-o-cresotinic acid were dissolved in 11 cc. of 36.5 percent hydrochloric acid and 200 cc. of water. Into the solution then 20 cc. of 5N sodium nitrite solution was dropped at 5° C., followed by 2 hours' stirring. The excessive hydrochloric acid was neutralized with sodium carbonate solution, and the system was added to a solution consisting of 20 g. of p-cresol, 10 g. of caustic soda and 200 cc. of water, at 5–7° C. After 5 hours' stirring, the system was let stand overnight. Whereupon the object dyestuff was precipitated in the form of yellowish brown sodium salt. THe precipitate was filtered and washed with a minor quantity of water. The cake was suspended in 400 cc. of water, heated and dissolved under addition of caustic soda. To the solution then hydrochloric acid was added to precipitate the dye as a free acid. The precipitate was filtered, washed with water and dried to yield 20 g. of a pure dyestuff.

The thus-refined dye was a yellow crystalline material having a melting point of 240° C., which was soluble in conc. sulfuric acid, giving a red solution. The dye was also soluble in aqueous caustic soda in red color. The results of its elementary analysis were as follows:

As $C_{15}H_{14}N_2O_4$;

| | C | H | N |
|---|---|---|---|
| Calculated values (%) | 62.94 | 4.90 | 9.79 |
| Measured values (%) | 62.61 | 5.13 | 9.58 |

A disperse dye was formed from the above product by the steps of adding sodium dinaphthyl-methanesulfonate to the dye cake before drying, in a quantity of twice the dyestuff, grinding the mixture and drying the same. The disperse dye contained approximately 33 percent of the monoazo dye.

Separately, reversal of the foregoing coupling was experimented on the scale of 0.1 mol gram. That is, diazotized o-amino-p-cresol was added to an alkali solution of o-cresotinic acid, performing the coupling in the conventional manner. The resultant precipitate was filtered and dried to yield 11 g. of a dyestuff. The dye was dark brown powder, soluble in conc. sulfuric acid in brown color, and also in caustic soda solution, in reddish brown color. The product dyed aluminium-modified polypropylene fibers in not yellow but light reddish brown color, having a poor light fastness.

EXAMPLE 2

0.3 gram of the so obtained finely powdered dye was dispersed in 500 cc. of water, to which were added 0.25 gram of a nonionic surfactant prepared from nonyl phenol and ethylene oxide and 0.2 cc. of acetic acid of 6° Be to prepare the dye bath. 10 grams of modified polypropylene containing 0.2 percent by weight of aluminum (basic aluminum stearate was incorporated) were dipped in this dye bath, which was then raised to the boil. The dyeing was carried out for one hour, followed by water-washing of the dyed fibers. The fibers were then heated for 20 minutes at 85° C. in 500 cc. of water in which had been dissolved 0.25 gram of "Monogen" (sulfates of higher alcohol; registered trade name of Daiichi Kogyo Company, Japan), 0.5 gram of caustic soda and 0.5 gram of sodium hydrosulfite, followed by washing with water. The dyed product so obtained exhibited a very brilliant yellow color, and its light fastnesses was 7-8, and drycleaning, nitrogen oxide gas, washing and rubbing were in all cases a rating of five. It was also fast to sublimation.

EXAMPLE 3

The dyeing of example 2 was repeated except that the fibers dyed was varied to nickel- and zinc-modified polypropylene fibers. The light fastness of the dyed yellow color was 7-8 and 6 respectively.

I claim:
1. A method of dyeing aluminum-modified polypropylene fibers, which comprises applying a monoazo dye of the formula

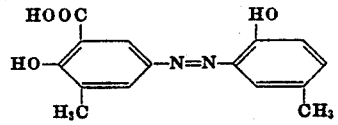

Ato aluminum-modified polypropylene fibers.
2. A method according to claim 1 wherein the monoazo dye is applied to the aluminum-modified polypropylene fibers in an aqueous medium.